US006250589B1

(12) United States Patent
Russ et al.

(10) Patent No.: US 6,250,589 B1
(45) Date of Patent: Jun. 26, 2001

(54) APPARATUS FOR LOCKING CONTROL SURFACES OF STICK CONTROLLED AIRCRAFT

(76) Inventors: Richard T. Russ, 4117 NW. 144th, Oklahoma City, OK (US) 73134; Thomas C. Williams, 11108 Coachman Rd., Yukon, OK (US) 73099

(*) Notice: Subject to any disclaimer, the term of this patent is extended or adjusted under 35 U.S.C. 154(b) by 0 days.

(21) Appl. No.: 09/501,779

(22) Filed: Feb. 10, 2000

(51) Int. Cl.[7] .......................... B64C 13/14; F16H 57/00; G05G 5/00

(52) U.S. Cl. .......................... 244/224; 244/1 R; 70/198; 70/203

(58) Field of Search .......................... 244/224, 1 R; 70/203, 18, 237, 198, 200, 212, 238, 199

(56) References Cited

U.S. PATENT DOCUMENTS

| | | | |
|---|---|---|---|
| 1,531,062 | 3/1925 | Barravecchia | 70/202 |
| 2,035,231 | 3/1936 | Haberstro, Jr. | 244/1 R |
| 3,298,242 | 1/1967 | Smith | 74/495 |
| 3,330,504 | 7/1967 | Lewis | 244/83 |
| 3,550,409 | 12/1970 | Pariser | 70/203 |
| 3,690,131 | 9/1972 | Davis | 70/203 |
| 3,833,190 | 9/1974 | Gaio | 244/83 |
| 3,898,823 | 8/1975 | Ludeman | 70/200 |
| 4,208,026 | 6/1980 | Reynolds | 244/224 |
| 4,475,366 | 10/1984 | Marneris | 70/258 |
| 5,129,603 | 7/1992 | Wippler | 244/224 |
| 5,713,539 | 2/1998 | Russ et al. | 244/224 |
| 5,724,838 | 3/1998 | Alicea | 70/18 |
| 5,911,391 | 6/1999 | Russ et al. | 244/224 |

OTHER PUBLICATIONS

Four catalog pages showing various types of locks for use on aircraft, source unknown, not dated.

*Primary Examiner*—Charles T. Jordan
*Assistant Examiner*—Christian M. Best
(74) *Attorney, Agent, or Firm*—Dunlap, Codding & Rogers, P.C.

(57) ABSTRACT

An apparatus for rigidly interlocking a control stick and the rudder pedals of an aircraft is provided for protecting the control surfaces of the aircraft operated by the control stick and the rudder pedals against wind loads. The apparatus comprises a control stick clamp assembly rigidly connected to one end of a first lever arm and a rudder pedal retaining assembly rigidly connected to another end of the first lever arm. A second lever arm has one end connected to the rudder pedal retaining assembly. The second lever arm is moveable between a collapsed position and an extended position wherein the distal end of the second lever arm is engageable with a support surface such that the second lever arm is able to support the rudder pedal retaining assembly in engagement with each of the rudder pedals and thereby cause, upon the control stick clamp assembly being secured to the control stick, the first lever arm to support the control stick in a selected position.

16 Claims, 3 Drawing Sheets

APPARATUS FOR LOCKING CONTROL SURFACES OF STICK CONTROLLED AIRCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to locking devices, and more particularly, but not by way of limitation, to an improved apparatus for securing the control surfaces of a stick controlled aircraft against wind loads by rigidly interlocking the control stick of the aircraft with the rudder pedals of the aircraft.

2. Description of Related Art

Certain types of small aircraft employ two pedals for controlling the rudder of the aircraft and a control stick for controlling the aileron and elevator control surfaces of the aircraft. When such aircraft are parked outside, the control surfaces are often subjected to high wind gusts. Gusts of wind can place significant loads on the rudder, the ailerons, and the elevators so as to cause them to flap and crash against their limit stops. Such flapping is undesirable in that it will prematurely wear or damage the control cables, the control linkages, and the control surfaces.

Additional damage can be incurred to the aircraft as a result of high winds passing over the control surfaces so as to cause all or portions of the aircraft to be lifted from the ground. For example, with most aircraft, if the elevators are in an up position, a gust of wind passing over the tail will have a tendency to cause the tail of the aircraft to drop thereby causing the nose of the aircraft to be lifted. Such movement of the aircraft can cause excessive damage to the aircraft, as well as other aircraft parked nearby.

Tail wheel type aircrafts are commonly referred to as a "conventional" or "tail dragger" because a portion of the landing gear includes a wheel extending downward from the tail of the aircraft, if the elevators are in a down position, a gust of wind passing (from the nose to the tail) and under the tail will have a tendency to cause the tail of the aircraft to be lifted thereby forcing the nose of the aircraft toward the ground which can result in substantial damage to the aircraft.

BRIEF SUMMARY OF THE INVENTION

The present invention is directed to an apparatus for interlocking the control stick and rudder pedals of an aircraft to secure the control surfaces of the aircraft against wind loads. The apparatus includes a control stick clamp assembly rigidly connected to one end of a first lever arm and a rudder pedal retaining assembly rigidly connected to another end of the first lever arm. A second lever arm has one end connected to the rudder pedal retaining assembly. The second lever arm is moveable between a collapsed position and an extended position wherein another end of the second lever arm is engageable with a support surface such that the second lever arm is able to support the rudder pedal retaining assembly in engagement with each of the rudder pedals and thereby cause, upon the control stick clamp assembly being secured to the control stick, the first lever arm to support the control stick in a selected position.

The objects, features and advantages of the present invention will become apparent from the following detailed description when read in conjunction with the accompanying drawings and appended claims.

DETAILED DESCRIPTION OF THE INVENTION

Figure 1:
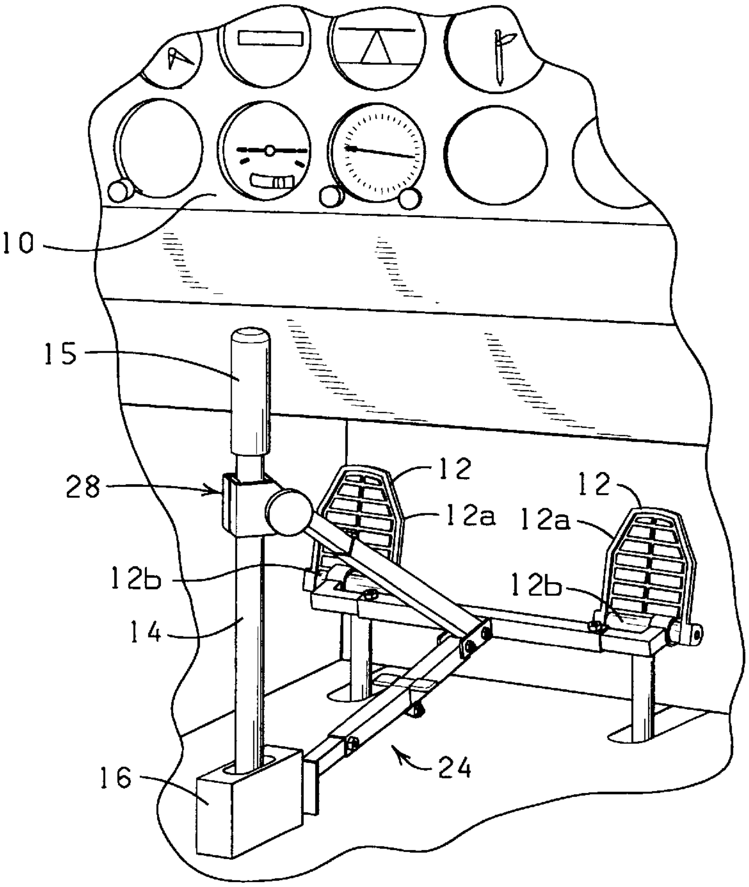
FIG. 1 is a perspective view of a portion of an aircraft control panel shown with a locking apparatus constructed in accordance with the present invention secured to the control stick and the rudder pedals of the aircraft.
Figure 5:
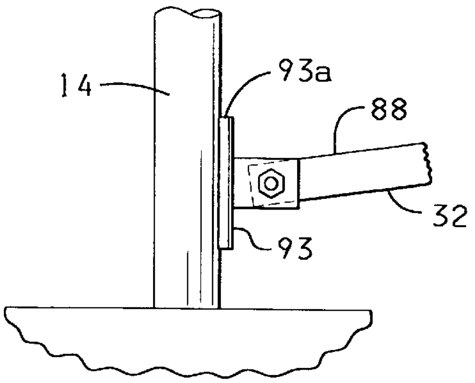
FIG. 5 is a side view of a second lever arm of the locking apparatus of the present invention shown engaged with a portion of the control stick.

Referring now to the drawings, and more particularly to FIG. 1, shown is a portion of a typical aircraft control panel 10 and a pair of rudder pedals 12 of a typical lightweight aircraft. A control stick 14 having a grip portion 15 is shown extending from a rectangular housing 16 which is mounted to the floor of the aircraft. It will also be appreciated that the control stick 14 may extend directly from the floor of the aircraft as illustrated in FIG. 5. Movement of the control stick 14 in a to and fro direction operates the elevators (not shown) between a level position, an up position wherein the control stick 14 is pulled back, and a down position wherein the control stick 14 is pushed forward. Further, movement of the control stick 14 in a side to side direction operates the ailerons (not shown) between a level position, a right bank position, and a left bank position.

The rudder pedals 12 operate the rudder (not shown) and each rudder pedal 12 includes a plate member 12*a* supported by a lever 12*b*. Alternatively, the rudder pedals 12 may not be provided with a plate member and only comprise a T-shaped lever. The rudder pedals 12 are operable, in a conventional manner, between a neutral or centered position wherein the rudder pedals 12 are in a side-by-side relationship, a right rudder position wherein the right rudder pedal is depressed inwardly relative to the left rudder pedal, and a left rudder position wherein the left rudder pedal is depressed inwardly relative to the right rudder pedal. The rudder pedals 12 may also be pivotable about the lower ends thereof by depressing the top end of the plate member 12a to set a parking brake, if provided.

The control stick 14 and the rudder pedals 12 are shown in FIG. 1 to be rigidly interlocked with a locking apparatus 24 constructed in accordance with the present invention. The locking apparatus 24 is adapted to interlock the control stick 14 and the rudder pedals 12. While it will be appreciated that the control stick 14 can be secured in any desired position, it is preferable that the control stick 14 be retained in a substantially vertical position wherein the right and left ailerons are substantially level with one another, the elevators are retained in either an up, down, or level position depending on pilot preference, and the rudder pedals 12 are in a neutral or centered position. With the control stick 14 secured in the near vertical position and the rudder pedals 12 in the neutral or centered position, the control surfaces of the aircraft are secured in positions wherein the control surfaces are minimally affected by wind gusts, and what effect the wind does have on the control surfaces, will tend to force the aircraft toward the ground rather than lift the aircraft from the ground which, as previously mentioned, can result in substantial damage to the aircraft, as well as nearby aircraft.

The control stick 14 and the rudder pedals 12 are conventional components of many small lightweight airplanes, and the operation of such components is well known to persons familiar with such aircraft. Thus, no further description of such components or the operation of such components is believed necessary to enable one to fully understand the present invention which will now be described in detail.

Figure 3:
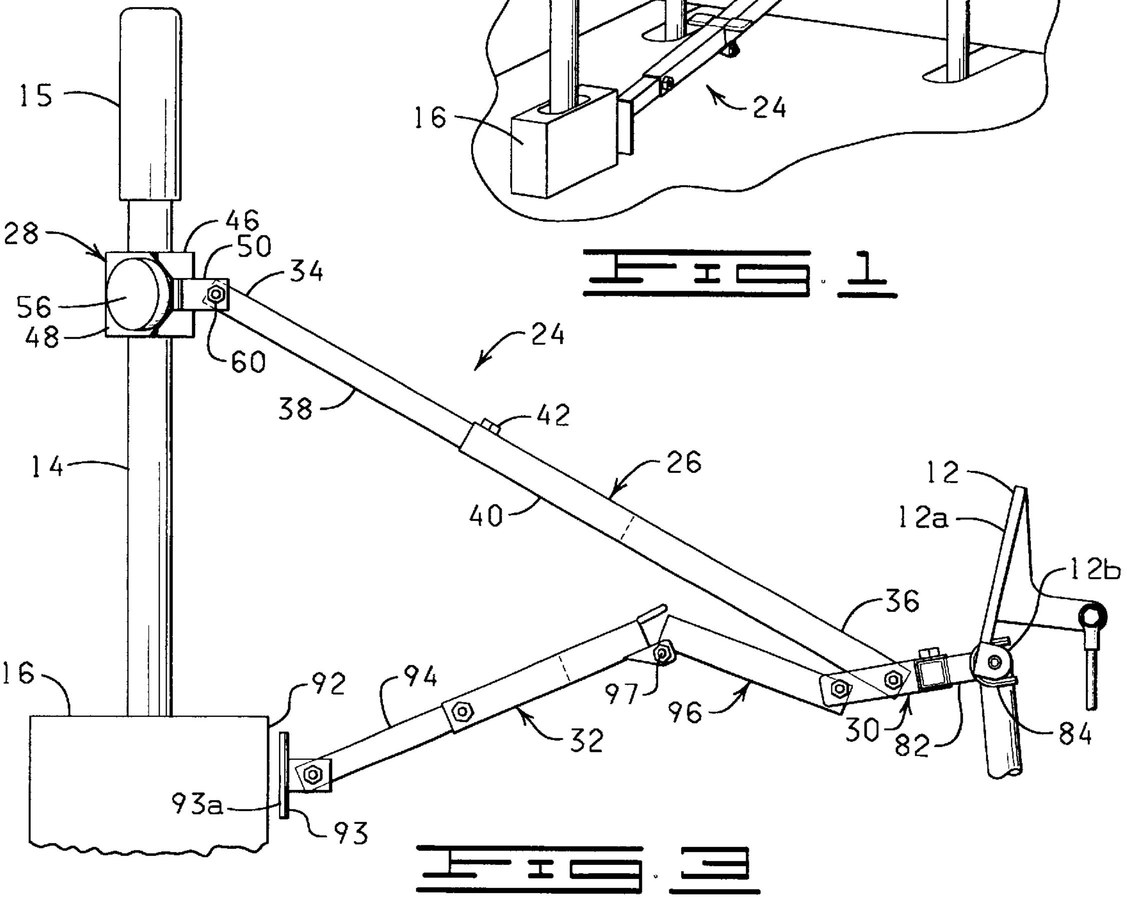
FIG. 3 is a side view of the locking apparatus of the present invention shown in an unlocked position.
Figure 2:
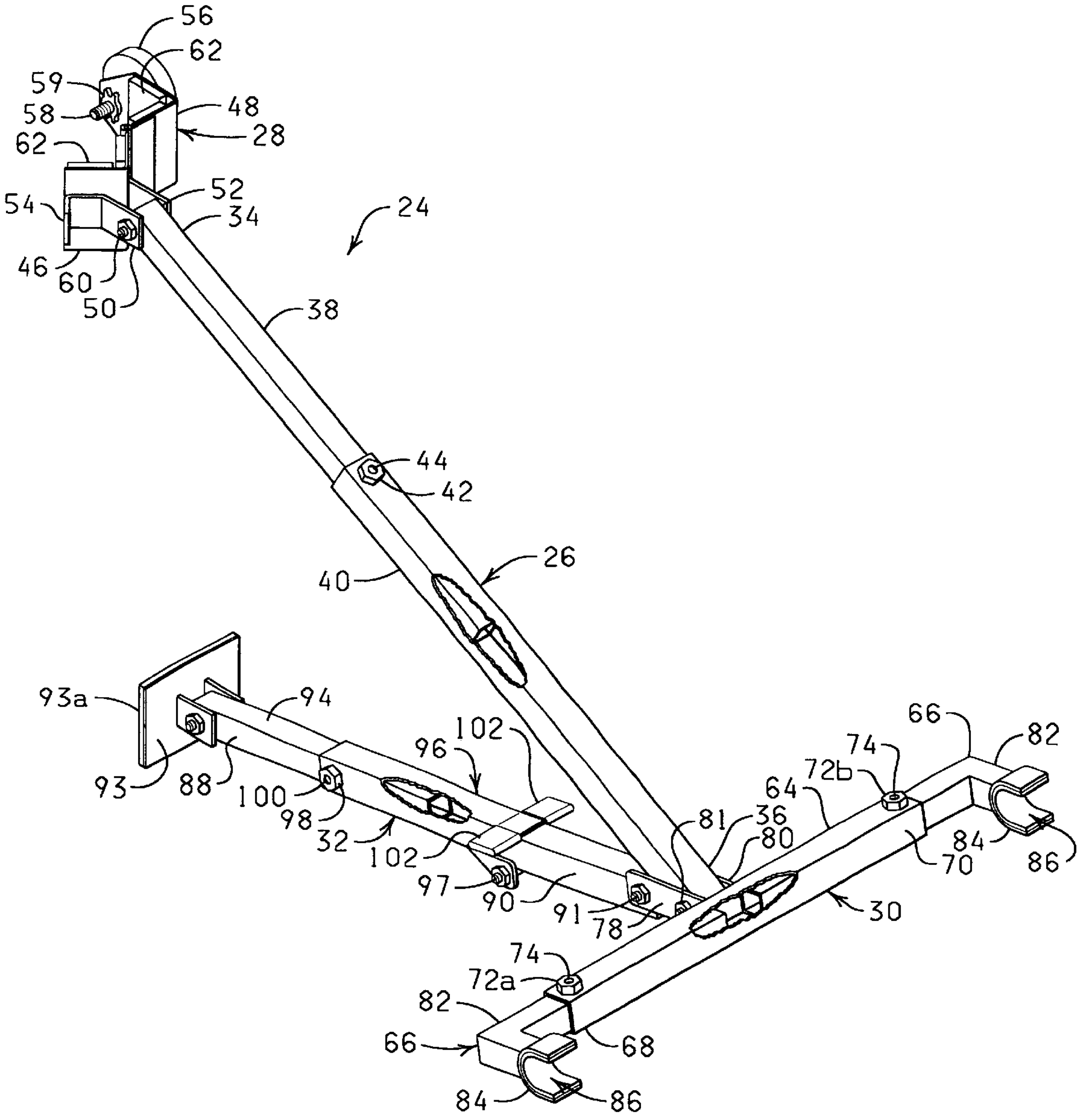
FIG. 2 is a partially cutaway, perspective view of the locking apparatus of the present invention.

Referring now to FIGS. 2 and 3, the locking apparatus 24 includes a first lever arm 26, a control stick clamp assembly 28, a rudder pedal retaining assembly 30, and a second lever arm 32. The first lever arm 26 has a first end 34 and a second end 36 and preferably includes a first rod member 38 and a second rod member 40 which is disposed in a telescoping relationship with respect to the first rod member 38 whereby the length of the first lever arm 26 is selectively adjustable. The first rod member 38 and the second rod member 40 are preferably constructed of a square-shaped, steel tubing, but the first and second rod members 38 and 40 may be constructed of any rigid, high strength material having a non-circular cross section, wherein the first rod member 38 is slidingly disposable in the second rod member 40 such that the first rod member 38 is non-rotatable relative to the second rod member 40 when the first rod member 38 is disposed in the telescoping relationship with respect to the second rod member 40. The second rod member 40 is provided with a threaded opening 42 positioned proximate one end of the second rod member 40 for threadingly receiving a securing device, such as a set screw 44, for securing the first rod member 38 in a selected position relative to the second rod member 40.

The control stick clamp assembly 28 is connected to the first end 34 of the first lever arm 26. The control stick clamp assembly 28 includes a first clamp portion 46 and second clamp portion 48 which is hinged to the first clamp portion 46 whereby the control stick clamp assembly 28 is positionable between a clamping position (FIGS. 1 and 3) wherein the first and second claim portions 46 and 48 cooperate to form an enclosure for holding the control stick 14 and a release position (FIG. 2) wherein the second clamp portion 48 is swung open relative to the first clamp portion 46. The first and second clamp portions 46 and 48 are each substantially V-shaped members which cooperate to form a substantially square shaped structure when the control stick clamp assembly 28 is in the clamping position.

A first bracket 50 and a second bracket 52 are secured to the first clamp portion 46 so as to permit the control stick clamp assembly 28 to be secured to the first end 34 of the first lever arm 26. The first bracket 50 includes a flange portion 54 provided with a threaded opening (not shown) which is adapted to receive a clamp knob 56 having a threaded shaft 58 supported by the second clamp portion 48. A crimp washer 59, or other suitable device, is provided on the threaded shaft 58 to help retain the threaded shaft 58 in the threaded opening of the first bracket 50.

The control stick clamp assembly 28 is preferably connected to the first end 34 of the first lever arm 26 with a lock nut and bolt combination 60 so that the position of the clamp assembly 28 may be selectively adjusted, yet the clamp assembly 28 rigidly connected to the first lever arm 26 when the locking apparatus 24 is in use. The inner surfaces relative to the first lever arm 26 of the first and second clamp portions 46 and 48 are provided with a padded material 62 to prevent damage to the control stick 14 when the control stick clamp assembly 28 is secured about the control stick 14. To accommodate control sticks of various diameters, the padded material 62 can be interchanged with padded materials of various thicknesses.

The rudder pedal retaining assembly 30 is connected to the second end 36 of the first lever arm 26 so as to be engageable with each of the rudder pedals 12 when the control stick clamp assembly 28 is secured to the control stick 14. The rudder pedal retaining assembly 30 includes a cross bar 64 and a pair of rudder pedal retaining assemblies 66. The cross bar 64 is constructed of a square, steel tubing so as to have a first open end 68 and a second open end 70. The cross bar 64 is provided with a pair of threaded openings 72*a* and 72*b*, each positioned approximate the first and second open ends 68 and 70, respectively, for threadingly receiving a securing device, such as a set screw 74. A first bracket 78 and a second bracket 80 are connected to a medial portion of the cross bar 64 in a spaced apart parallel relationship for receiving the second end 36 of the first lever arm 26 and one end of the second lever arm 32 in a manner to be described in greater detail below. The second end 36 of the first lever arm 26 is connected to the first and second brackets 78 and 80 with a lock nut and bolt combination 81, or other suitable device.

The rudder pedal retaining assemblies 66 each include an L-shaped insert tube 82 and a rudder pedal retaining member 84. The insert tube 82 is constructed of a square tubing sized so that the insert tubes 82 are slidingly received in the first and second open ends 68 and 70, respectively, of the cross bar 64 in a telescoping manner. The rudder pedal retaining members 84 each have a substantially U-shaped configuration defining a lever receiving space 86. The lever receiving space 86 is sized to retainingly receive a correspondingly shaped portion of the rudder pedals 12 as shown in FIG. 3. It should be appreciated that the rudder pedal retaining members 84 may be provided with any configuration suitable for grippingly engaging a portion of the rudder pedal 12.

The second lever arm 32 is characterized as having a first end 88 and a second end 90 which is pivotally connected to the rudder pedal retaining assembly 30 with a lock nut and bolt combination 91 such that the second lever arm 32 is angularly disposed relative to the first lever arm 26. The first end 88 of the second lever arm 32 is engageable with a suitable support surface such as a surface 92 of the housing 16 (FIGS. 1,3, and 4) or a portion of the control stick 14 (FIG. 5), such that the second lever arm 32 is able to support the rudder pedal retaining assembly 30 in engagement with each of the rudder pedals 12 and thereby cause, upon the control stick clamp assembly 28 being secured to the control stick 14, the first lever arm 26 to support the control stick 14 in a selective position. To facilitate engagement of the first end 88 of the second lever arm 32 with the support surface, a plate member 93 having a non-skid material 93*a* applied thereto is pivotally connected to the first end 88 of the second lever arm 32.

Figure 4:
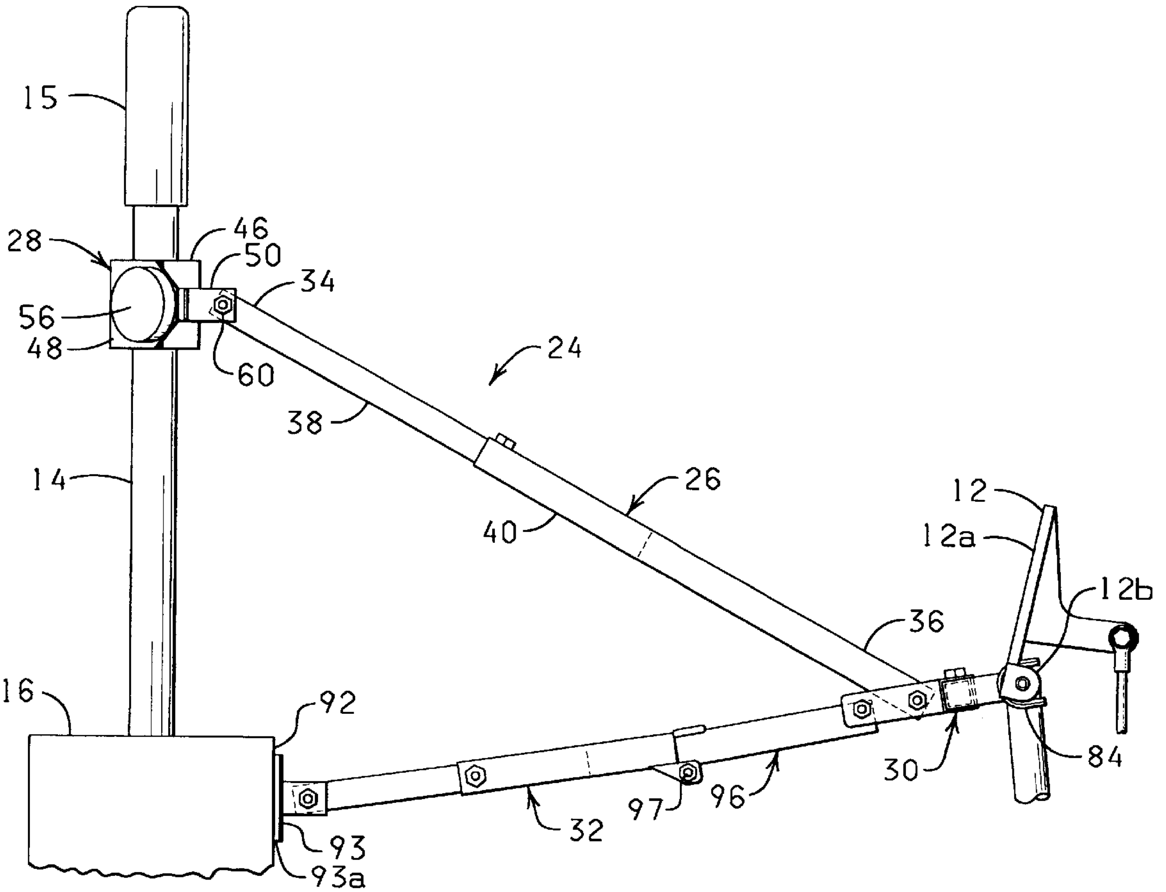
FIG. 4 is a side view of the locking apparatus of the present invention shown secured to the control stick and to the rudder pedals.

To facilitate installation and removal of the locking apparatus 24, the second lever arm 32 is moveable between a collapsed position (FIG. 3) and an extended position (FIGS. 1, 2, and 4). More specifically, the second lever arm 32 includes a rod member 94 and an over center rod assembly 96. The over center rod assembly 96 is moveable between a folded position (FIG. 3) and an extended position (FIGS. 1, 2, and 4) about a pivot point 97. The over center rod assembly 96 is disposed in a telescoping relationship with respect to the rod member 94 whereby the length of the second lever arm 32 is selectively adjustable. The rod member 94 and the over center rod assembly 96 are constructed of square, steel tubing such that the rod member 94 is disposed in a non-rotatable, telescoping relationship with respect to the over center rod assembly 96. A portion of the over center rod assembly 96 is provided with a threaded opening 98 for threadingly receiving a securing device, such as a set screw 100. The over center rod assembly 96 is provided with a pair of tabs 102 to facilitate moving the over center rod assembly 96 between the folded position and the extended position.

OPERATION

To initially adjust the locking apparatus 24, the rudder pedal retaining assemblies 66 are adjusted so that each of the rudder pedal retaining members 84 are properly spaced apart to fit over the corresponding portion of the rudder pedal 12 when the first lever arm 26 and a second lever arm 32 are aligned with the control stick 14 in a neutral position. With the rudder pedal retaining members 84 properly spaced, the set screws 74 are tightened to secure the rudder pedal retaining assemblies 66 in position. Next, the set screw 100 of the second lever arm 32 is loosened, the lock nut and bolt combination 60 is loosened to allowed movement of the control stick clamp assembly 28, and the lock nut and bolt combination 81 at the second end 36 of the first lever arm 26 is loosened to permit the first lever arm 26 to be rotated relative to the rudder pedal retaining assembly 30. Further, the set screw 44 or the first lever arm 26 is loosened to permit the first rod member 38 to be moved relative to the second rod member 40. The control stick clamp assembly 28 is next secured about the control stick 14 in the clamping position. The rudder pedal retaining members 84 are then positioned over the levers 12*b* of the rudder pedals 12. With the control stick 14 in the neutral position (or slightly down elevated) the set screw 44 is tightened and the lock nut and bolt combination 81 is tightened, thereby rigidly connecting the first lever arm 26 to the rudder pedal retaining assembly 30.

Next, the rod member 94 of the second lever arm 32 is extended from the over center rod assembly 96 until a plate member 93 engages the housing 16 or the base of the control stick 14 with the over center rod assembly 96 in the folded position illustrated in FIG. 3. The set screw 100 is then tightened. The tabs 102 are then pressed down to snap the over center rod assembly 96 into the extended position as illustrated in FIG. 4.

After the initial, and one time, adjustment of the locking apparatus 24, the locking apparatus 24 is removed from the aircraft by lifting up on tabs 102 and moving the over center rod assembly 96 to the folded position and loosening the clamp knob 56 to permit the control stick clamp assembly 28 to be moved to the release position. To install the locking apparatus 24, the rudder pedal retaining members 84 are positioned on the levers 12b of the rudder pedals 12, and the plate member 93 is positioned against the housing 16 or the control stick 14. The over center rod assembly 96 is then moved to the extended position whereby the second lever arm 32 supports the rudder pedal retaining assembly 30 in engagement with each of the rudder pedals 12. Finally, the control stick clamp assembly 28 is installed around the control stick 14 and the clamp knob 56 is tightened whereby the first lever arm 26 supports the control stick 14 in the selected position.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed:

1. An apparatus for rigidly interlocking a control stick and a pair of rudder pedals of an aircraft to secure the control surfaces of the aircraft operated by the control stick and the rudder pedals in a stable position, the control stick movable in a to and fro direction to operate the elevator control surfaces of the aircraft between an up position, a level position, and a down position and the control stick movable in a side to side direction to operate the aileron control surfaces of the aircraft between a right bank position, a level position, and a left bank position, each of the rudder pedals movable between a neutral position and a depressed position to operate the rudder control surface of the aircraft, the apparatus comprising:

a first lever arm having a first end and a second end;

a control stick clamp assembly connected to the first end of the first lever arm, the control stick clamp assembly having a clamping position wherein the control stick clamp assembly is secured to the control stick and a release position;

a rudder pedal retaining assembly connected to the second end of the first lever arm so as to be engageable with each of the rudder pedals when the control stick clamp assembly is secured to the control stick; and a second lever arm having a first end and a second end, the second end of the second lever arm connected to the rudder pedal retaining assembly, the first end of the second lever arm engageable with a support surface such that the second lever arm is able to support the rudder pedal retaining assembly in engagement with each of the rudder pedals and thereby cause, upon the control stick clamp assembly being secured to the control stick, the first lever arm to support the control stick in a selected position.

2. The apparatus of claim 1 wherein the first lever arm comprises:

a first rod member; and a second rod member disposed in a telescoping relationship with respect to the first rod member whereby the length of the first lever arm is adjustable.

3. The apparatus of claim 2 wherein each of the first and second rod members has a non-circular cross section and wherein the first rod member is matingly disposed in the second rod member such that the first rod member is non-rotatable relative to the second rod member when the first rod member is disposed in the telescoping relationship with respect to the second rod member.

4. The apparatus of claim 1 wherein the rudder pedal retaining assembly comprises:

a pair of rudder pedal retaining members rigidly connected to the second end of the first rod member in a spaced apart, parallel relationship with one another, each of the rudder pedal retaining members configured to retainingly engage one of the rudder pedals.

5. The apparatus of claim 4 wherein each of the rudder pedal retaining members has a generally U-shaped portion.

6. The apparatus of claim 4 wherein the space between the rudder pedal retaining members is selectively adjustable.

7. The apparatus of claim 1 wherein the first end of the second lever arm is provided with a plate member having a non-skid material applied thereto.

8. An apparatus for rigidly interlocking a control stick and a pair of rudder pedals of an aircraft to secure the control surfaces of the aircraft operated by the control stick and the rudder pedals in a stable position, the control stick movable in a to and fro direction to operate the elevator control surfaces of the aircraft between an up position, a level position, and a down position and the control stick movable in a side to side direction to operate the aileron control surfaces of the aircraft between a right bank position, a level position, and a left bank position, each of the rudder pedals movable between a neutral position and a depressed position to operate the rudder control surface of the aircraft, the apparatus comprising:

a first lever arm having a first end and a second end;

a control stick clamp assembly rigidly connected to the first end of the first lever arm, the control stick clamp assembly having a clamping position wherein the control stick clamp assembly is secured to the control stick and a release position;

a rudder pedal retaining assembly rigidly connected to the second end of the first lever arm so as to be engageable with each of the rudder pedals when the control stick clamp assembly is secured to the control stick; and a second lever arm having a first end and a second end, the second end of the second lever arm connected to the rudder pedal retaining assembly, the second lever arm moveable between a collapsed position and an extended position, the first end of the second lever arm engageable with a support surface when the second lever arm is in the extended position such that the second lever arm is able to support the rudder pedal retaining assembly in engagement with each of the rudder pedals and thereby cause, upon the control stick clamp assembly being secured to the control stick, the first lever arm to support the control stick in a selected position.

9. The apparatus of claim 8 wherein the second lever arm comprises:

a rod member; and an over center rod assembly movable between a folded position and an extended position and disposed in a telescoping relationship with respect to the rod member whereby the length of the second lever arm is adjustable.

10. The apparatus of claim 8 wherein the first lever arm comprises:

a first rod member; and a second rod member disposed in a telescoping relationship with respect to the first rod member whereby the length of the first lever arm is adjustable.

11. The apparatus of claim 10 wherein each of the first and second rod members has a non-circular cross section and wherein the first rod member is matingly disposed in the second rod member such that the first rod member is non-rotatable relative to the second rod member when the first rod member is disposed in the telescoping relationship with respect to the second rod member.

12. The apparatus of claim 8 wherein the rudder pedal retaining assembly comprises:

a pair of rudder pedal retaining members rigidly connected to the second end of the first rod member in a spaced apart, parallel relationship with one another, each of the rudder pedal retaining members configured to retainingly engage one of the rudder pedals.

13. The apparatus of claim 12 wherein each of the rudder pedal retaining members has a generally U-shaped portion.

14. The apparatus of claim 12 wherein the space between the rudder pedal retaining members is selectively adjustable.

15. The apparatus of claim 8 wherein the first end of the second lever arm is provided with a plate member having a non-skid material applied thereto.

16. An apparatus for rigidly interlocking a control stick and a pair of rudder pedals of an aircraft to secure the control surfaces of the aircraft operated by the control stick and the rudder pedals in a stable position, the control stick movable in a to and fro direction to operate the elevator control surfaces of the aircraft between an up position, a level position, and a down position and the control stick movable in a side to side direction to operate the aileron control surfaces of the aircraft between a right bank position, a level position, and a left bank position, each of the rudder pedals movable between a neutral position and a depressed position to operate the rudder control surface of the aircraft, the apparatus comprising:

a first lever arm having a first end and a second end;

a control stick clamp assembly rigidly connected to the first end of the first lever arm, the control stick clamp assembly having a clamping position wherein the control stick clamp assembly is secured to the control stick and a release position;

a rudder pedal retaining assembly rigidly connected to the second end of the first lever arm so as to be engageable with each of the rudder pedals when the control stick clamp assembly is secured to the control stick; and a second lever arm having a first end and a second end, the second end of the second lever arm connected to the rudder pedal retaining assembly, the first end of the second lever arm engageable with a portion of the control stick such that the second lever arm is able to support the rudder pedal retaining assembly in engagement with each of the rudder pedals and thereby cause, upon the control stick clamp assembly being secured to the control stick, the first lever arm to support the control stick in a selected position.

* * * * *